United States Patent [19]
Yang et al.

[11] Patent Number: 5,999,602
[45] Date of Patent: Dec. 7, 1999

[54] TELEPHONE WITH INTERFACE LINKING TO TELEVISION

[75] Inventors: Wen-Wei Yang; Zhang Hui, both of Nanjing, China; Jeffrey Lai, Taipei, Taiwan

[73] Assignee: Inventec Corporation, Taipei, Taiwan

[21] Appl. No.: 09/217,310

[22] Filed: Dec. 18, 1998

[51] Int. Cl.[6] .................................................. H04M 11/00
[52] U.S. Cl. ...................... 379/110.01; 379/442; 348/552
[58] Field of Search ............................ 379/110.01, 90.01, 379/387, 441, 442, 447, 457, 93.05, 93.37, 93.17; 348/552

[56] References Cited

U.S. PATENT DOCUMENTS 4,456,925  6/1984  Skerlos et al. ...................... 379/110.01
5,920,806  7/1999  Gouessant .............................. 348/552

*Primary Examiner*—Wing F. Chan
*Attorney, Agent, or Firm*—W. Wayne Liauh

[57] ABSTRACT

The present invention relates to a telephone with an interface connection with the television, which includes a basic telephone set, central processing unit (CPU), display controller and a control program. The control program controls the whole operating procedures of the telephone of the invention. Under the operating procedures, the CPU transmits the phone-call information received by the basic telephone set to the display controller. In accordance to the received information, the display controller generates and transports a corresponding signal to a television. With the telephone of the invention, the information of a telephone call can be displayed in a television.

5 Claims, 6 Drawing Sheets

TELEPHONE WITH INTERFACE LINKING TO TELEVISION

BACKGROUND OF THE INVENTION

1. Field of the Invention

This invention relates to an interface device, more particularly to an interface device for connecting a telephone and a television.

2. Description of Related Art

In the past, televisions and telephones were two separate appliances, but they are integrated today. The new appliance assembling both objectives of telephone and television is not commonly used in families. The auxiliary capabilities of present telephones are highly enhanced. For example, they include the following capabilities of recording telephone numbers and names used as notebook and telephone directory. These auxiliary capabilities increase the complexity of present telephones; consequently, displays are necessary to help users. Black-and-white liquid-crystal display (LCD) is commonly used as display. However, since the resolution and contrast of small LCD is poor, its readability is insufficient to support the greater capabilities of future telephones. If traditional high-resolution and high-contrast television can be used to display telephone's information, the objectives of the display of traditional telephone can be greatly enhanced.

To achieve the above-mentioned objective, a new function is needed to enhance the traditional telephones. The objective of this additional function is to link the telephone with television, transmitting the telephone's information to the television, and displaying this information on the television.

SUMMARY OF THE INVENTION

The objective of the present invention is to facilitate a telephone interface connection to a television. The telephone of the present invention includes:

- a basic telephone set to receive communication information;
- a central processing unit (CPU) to process the received information;
- a display controller to generate meaningful image signals to the television according to the processed information of the CPU; and
- a control program to realized the action that the CPU of the invention controls the controller of the television.

In addition, the display controller has a memory unit, a clock-generation unit, a synchronized-signal-generation unit, a control unit and an output unit. Under the control unit, the clock-generation unit operates as a suitable clock and the synchronal-signal-generation unit generates a synchronous signal according to the processed information of the CPU. Then the output unit transmits these signals to the television. Besides, the display controller also includes an input unit for receiving external signals and blends them with the generated signals of the display controller.

The output unit of the display controller can be connected to a television with built-in A/V terminal to transmit the information from the CPU to the TV, and the input unit of the display controller can be linked to a video recorder without interfering the existing capability of the TV. The price and size of the current range of telephones of the present invention can be reduced with the television operating as the display of the telephone. In addition, the large-sized screen and color display of the television increase the readability of the information of the telephone. For instance, with the telephone connected to the television, phone call can be received simultaneously as the user is watching a ball game, the caller identity delivery (CID) of this phone call can be displayed in the television without interrupting the program of this ball game.

BRIEF DESCRIPTION OF THE DRAWINGS

Other objects, features and advantages of the invention will become apparent from the following detailed description of the preferred but non-limiting embodiments. The description is made with reference to the accompanying drawings in which.

DETAILED DESCRIPTION OF THE INVENTION

Figure 1:
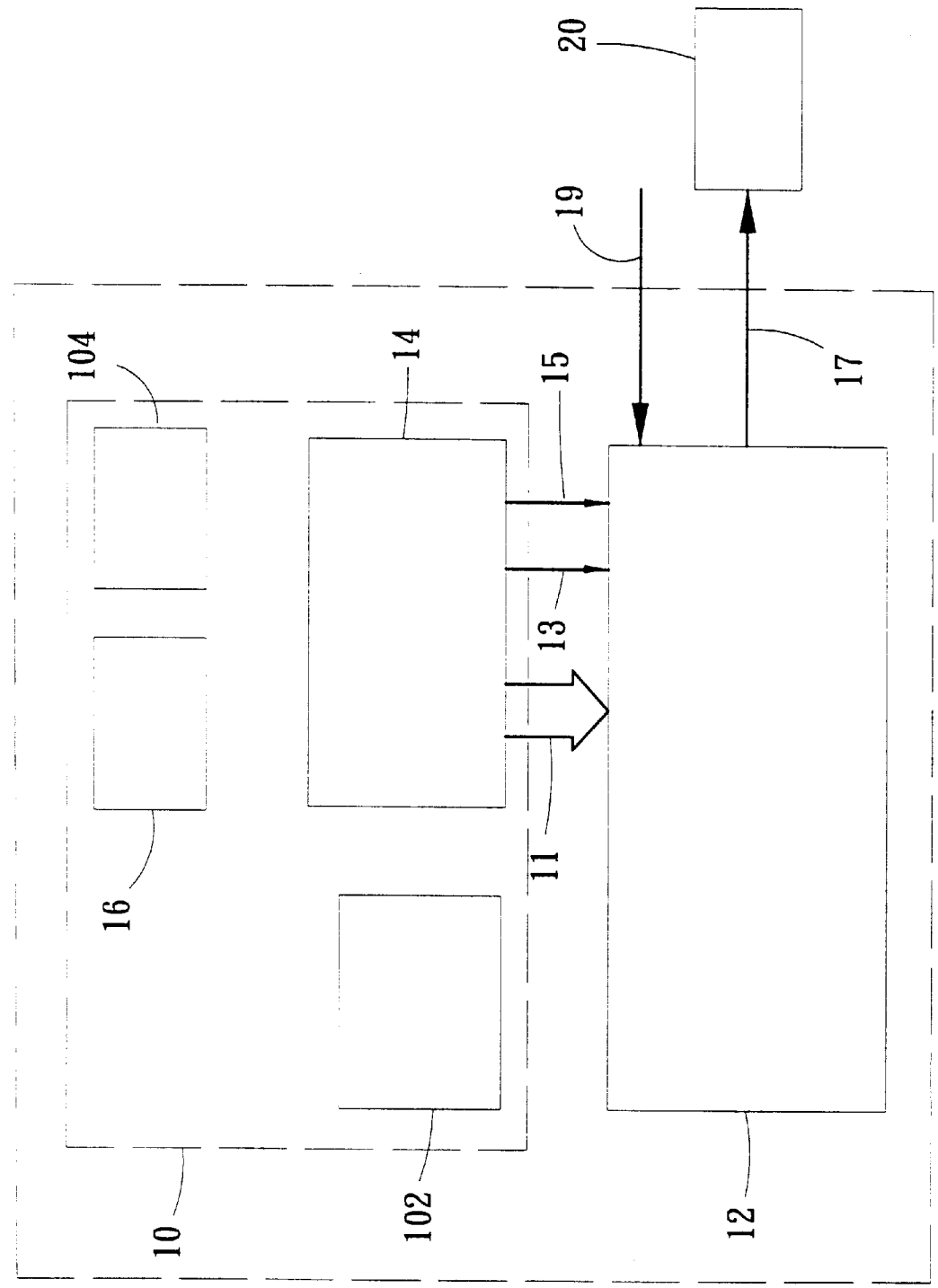
FIG. 1 shows the block diagram of an embodiment of the telephone according to the present invention.

Please refer to FIG. 1, which shows the block diagram of an embodiment of the telephone according to the present invention. The telephone of the invention includes a basic telephone set 10 and a display controller 12. The basic telephone 10 has a central-processing unit CPU 14, a dialer 102, a handset 104 and a liquid-crystal display LCD 16. The dialer 102 and the handset 104 are the essential parts of a telephone for the basic functions transmitting and receiving the communicating information of the telephone call. For additional functions, the CPU 14 is to handle and process the received information of a telephone call. The LCD 16 is to display the telephone's information, and it is important that the LCD 16 can be removed in this invention.

The difference of the present invention and the prior art is that the current telephone includes the display controller 12 linked to the CPU 14. The display controller 12 generates a meaningful signal and transmits it to a television 20 according to the control command from the CPU 14. In order to integrate the basic phone 10 and the display controller 12, it is necessary to further include a control program (not shown in FIG. 1) which is a software program saved in a memory and is executed by the CPU 14 to give the control commands to the display controller 12. That is, the telephone of the present invention at least include a dialer, a handset, a central processing unit, a display controller, and a control module.

Figure 2:
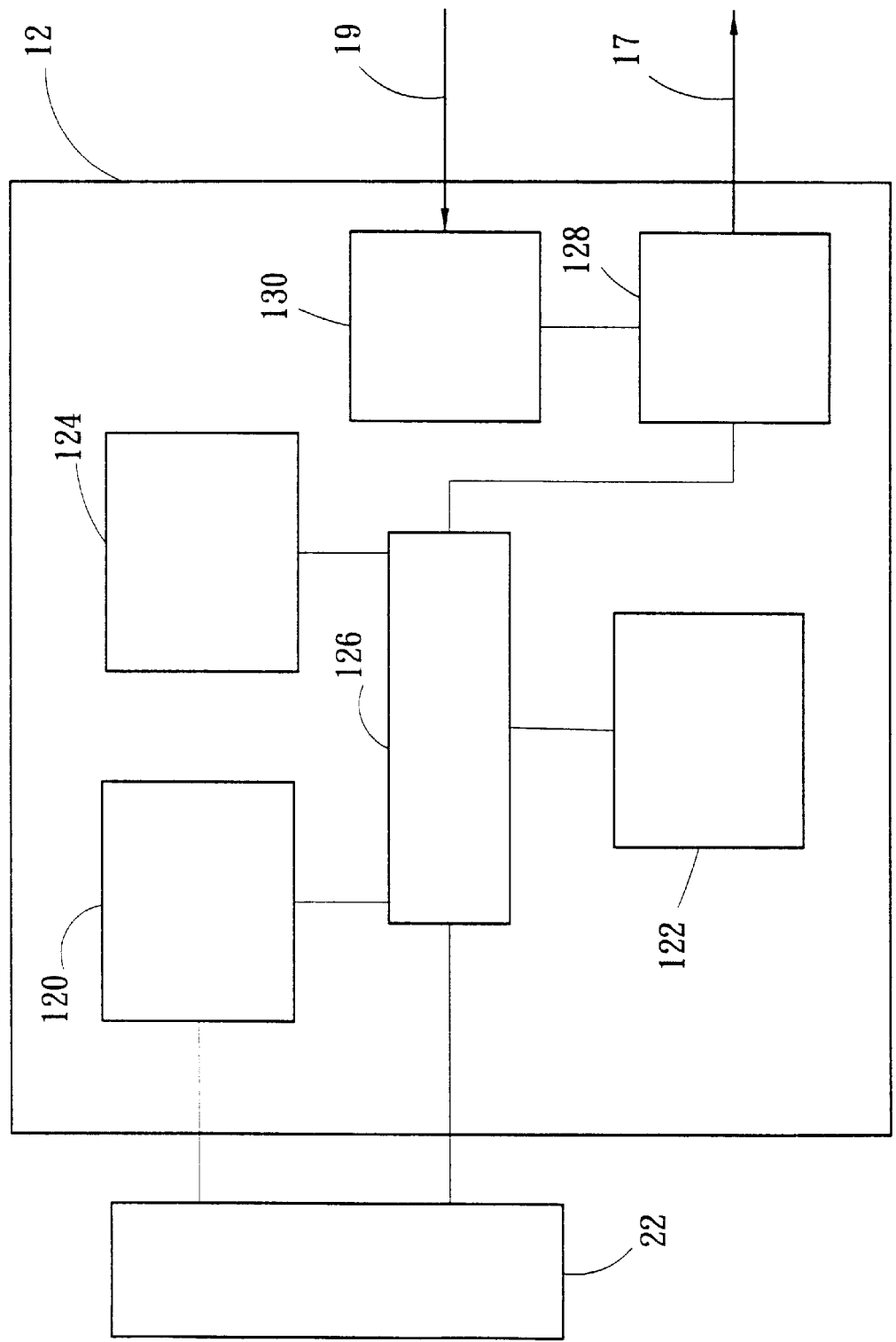
FIG. 2 shows the block diagram of the display controller of the embodiment shown in FIG. 1.

Please refer to FIG. 2, which shows the block diagram of the display controller 12 of the embodiment illustrated in FIG. 1. The display controller 12 includes a memory unit 120, a timer generator 122, a synchronal-signal generator 124, a control unit 126 and an output unit 128. The display controller 12 receives the display information from the data-in port 22 and then stores the received information in the memory unit 120. Next, the timer generator 122 generates a timer, and the synchronal-signal generator 124 produces a synchronous signal. The control unit 126 controls all operating procedures of the display controller 12. Finally, the display information is transmitted to the television 20 through the output unit 128 and is displayed on the television 20.

Referring to FIG. 1 and FIG. 2, the CPU 14 executes the control program to control all operating procedures of the telephone. When a telephone interfaced with the invention is correctly connected to the television 20, the display controller 12 receives the display information and controls signals from the CPU 14 through a data bus 11 and control wires 13 and 15, respectively. Then the display controller 12 stores these information and signals in its memory unit 120, and it generates a video-out signal 17 under the help of the timer generator 122 and the synchronal-signal generator 124 according to the stored information and signals. The video-out signal 17 is then transmitted to the television 20 through the output unit 128, and the display information is consequently shown on the television 20. All of the display controller's 12 operating procedures described above are handled by the control unit 126.

In addition, the telephone interfaced with the invention further includes an input unit 130 which is used to receive video signals from an external device and transmit these signals to the display controller 12. When a video-in signal 19 is received through the input unit 130, the display controller 12 generates a corresponding signal according to the video-in signal 19 and adds the corresponding signal to the video-out signal 17. Finally, the integrated video-out signal is transmitted to the television 20.

Figure 3:
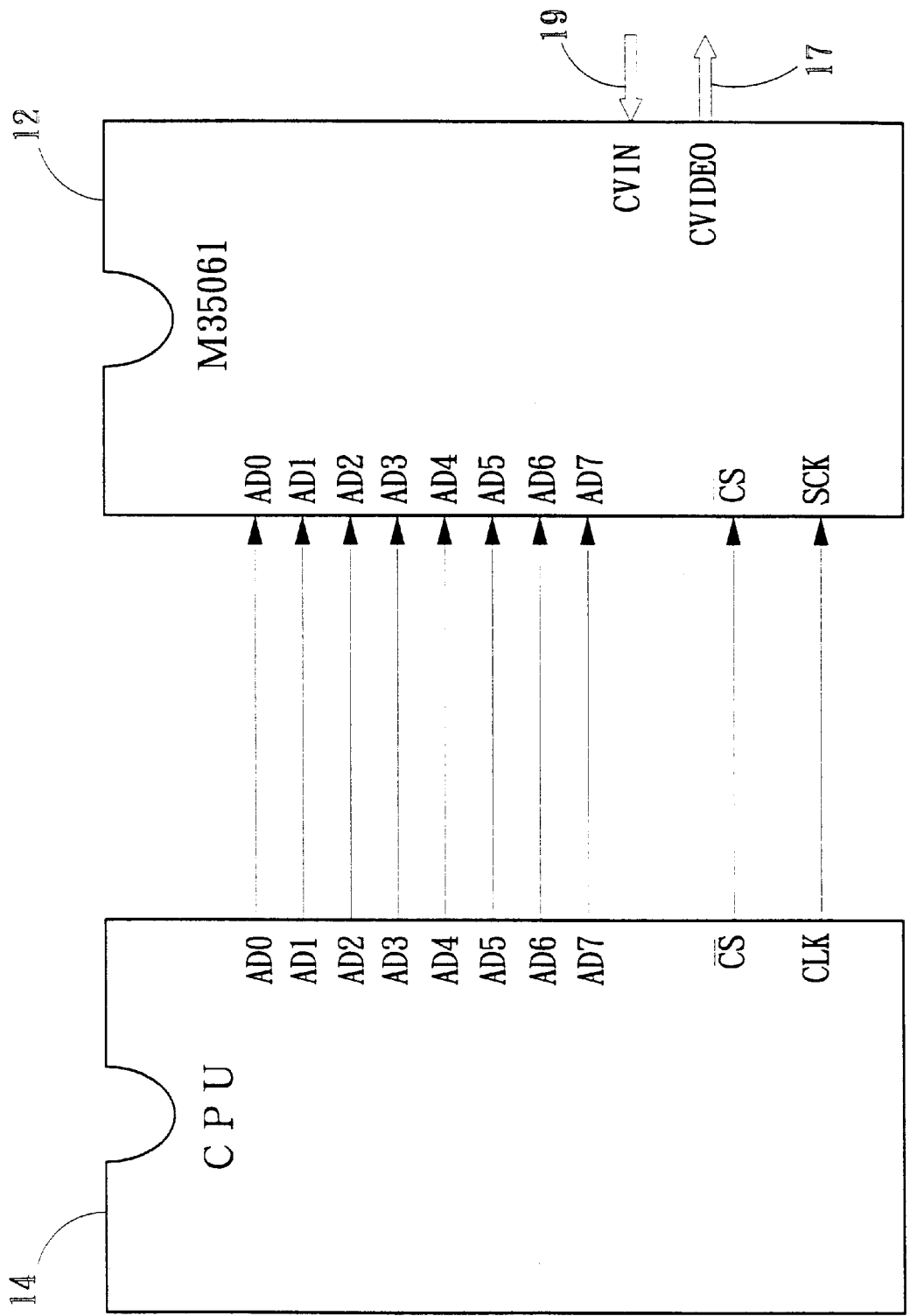
FIG. 3 shows the connection of the control processing unit and the display controller facilitated by M35061 IC produced by MITSUBISHI.

In order to operate the telephone interface, this embodiment for the display controller 12 is realized by the M35061 IC produced by MITSUBISHI, and its schematic diagram is shown in FIG. 3. FIG. 3 shows the connection of the control processing unit and the display controller facilitated by the M35061 IC produced by MITSUBISHI. The data/address buses from AD0 to AD7 of the CPU 14 and the display controller 12 (M35061) is inter-connected. These buses are used to transport display information and memory address information. The chip-select ports ($\overline{CS}$) of the display controller 12 and the CPU 14 are connected, and the clock-signal port (CLK) of the CPU 14 is linked to the synchronal port (SCK) of the display controller 12. The $\overline{CS}$ port is active as it is logically low. The synchronal port SCK of the display controller 12 is used to receive a synchronous signal from the CPU 14. In addition, the display controller 12 has a CVIDEO port and a CVIN port which are connected to the input port and the output ports of the television 20 respectively.

Figure 4:
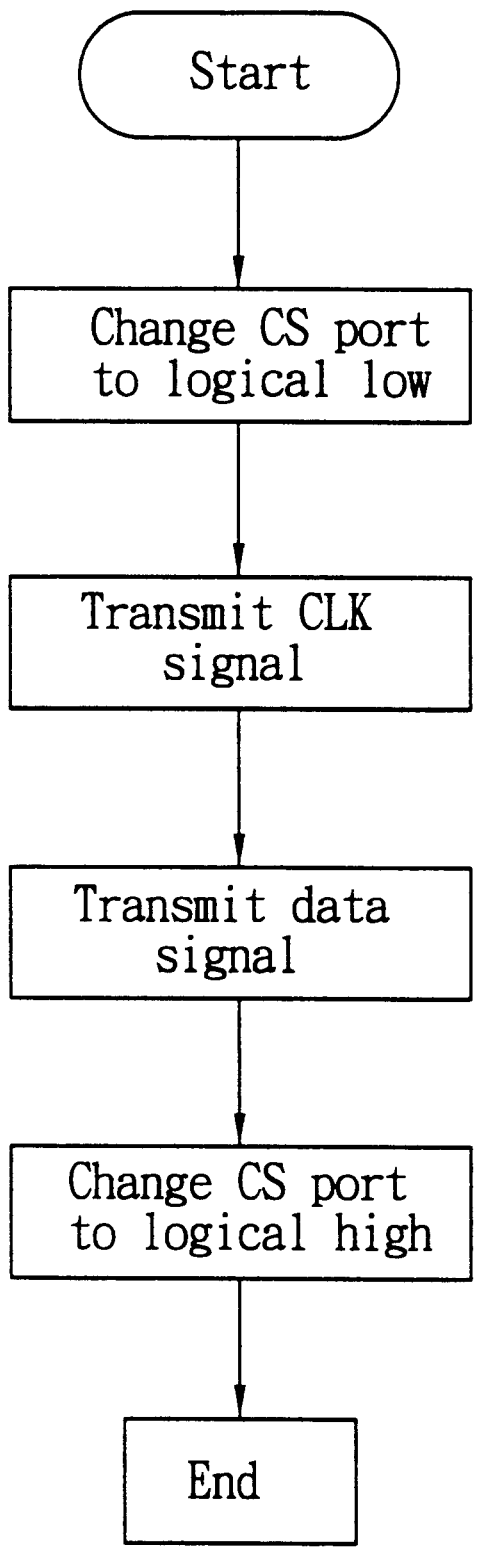
FIG. 4 shows the flow chart of the control signals between the CPU and the display controller.

Please refer to FIG. 4, which shows the flow chart of the control signals between the CPU 14 and the display controller 12. When the CPU 14 transports the display information to the display controller (M35061) 12, the chip-select ($\overline{CS}$) port is first changed to the logically low level. Next, the CPU 14 gives a time command clock to the display controller 12 for synchronization through the connection of the CLK and SCK ports. Then the CPU 14 transmits the display information to the display controller 12, and the sequence of the transmission is that three 8-bit address signals are initially transmitted and 8-bit data containing display information are then transmitted. When all of the 8-bit data for the display information have been transmitted completely, the $\overline{CS}$ port level is then changed logically high.

Figure 5:
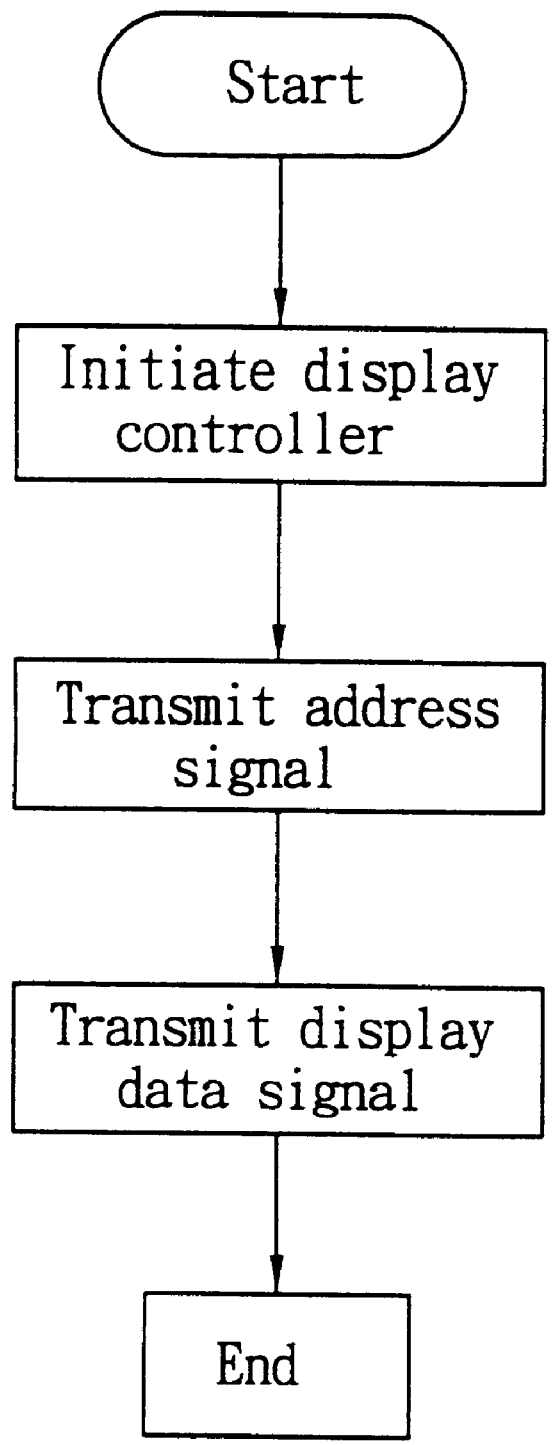
FIG. 5 shows the flow chart of the procedures of displaying a telephone's information with the television of the invention.

Please refer to FIG. 5, which is the flow chart of the procedures of displaying the telephone's information with the telephone of the invention. First, initiate the display controller 12 by setting the parameters and the display mode of the display controller 12. In order to store the display information in the memory unit 120 of the display controller 12, the start address of the memory for saving information is then defined. Next, initiate transmission of the display information, according to the stored display information, the display controller 12 then generates and sends a video signal to the television 20.

Figure 6:
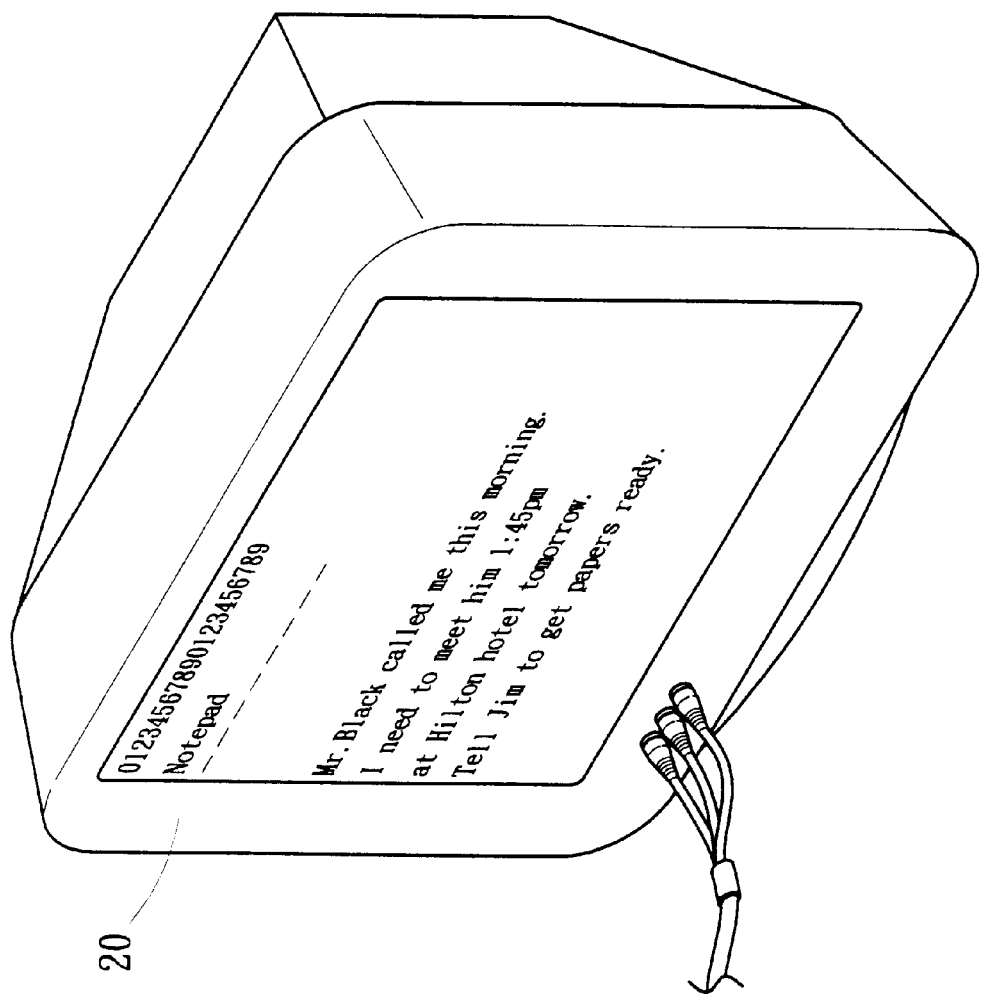
FIG. 6 shows the perspective view of a telephone of the invention connected to a television.

Please refer to FIG. 6, which is the perspective view of a telephone of the invention connected to a television. The interface of the display controller 12 is similar to that of a traditional video recorder. The output unit of the telephone of the invention is established by using an AV terminal 24. Consequently, the telephone of the invention can be linked to any traditional television with an AV terminal connector. Besides, the telephone of the invention includes an input unit (not shown in FIG. 6) which is also realized with an AV terminal. The input AV terminal can be linked to a traditional video recorder without limiting the basic function of the conventional television.

It is noted that the telephone with interface connected to a television described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A telephone with an interface connected to a television, comprising:
    a basic telephone set for receiving and transmitting a communication information of a phone call;
    a central processing unit for processing the communicated phone call received by the telephone set;
    a display controller connected to the central processing unit for receiving a display information and control signals received from the central processing unit so as to generate and transmit an image signal to the television; and
    a control program, executed by the central processing unit, for controlling the display controller.

2. The telephone with an interface connected to a television as claimed in claim 1, the display controller further includes a memory unit, a timing generator, a synchronal-signal generator, a control unit and an output unit, wherein the control unit controls all operating procedures of the display controller; the display information is stored in the memory unit; the timing generator and the synchronal-signal generator respectively generate a clock and a synchronous signal; the display controller generates a video signal in accordance with the display information; and the output unit transmits the video signal to the television.

3. The telephone with an interface connected to a television as claimed in claim 2 wherein the display controller further includes an input unit for receiving an external signal of an external device.

4. The telephone with an interface connected to a television as claimed in claim 3 wherein the external signal is a video signal; the video signal is then added to the video signal generated by the display controller; and the combined video signal is transmitted to the television through the output unit.

5. The telephone with an interface connected to a television as claimed in claim 3 wherein the external signal is transformed into a video signal by the display controller; the video signal is then added to the video signal generated by the display controller; and the combined video signal is transmitted to the television via the output unit.

* * * * *